Oct. 25, 1955 G. R. BOUCHARD 2,721,458
UNIVERSAL JOINT TRANSMISSION DEVICES, IN PARTICULAR
FOR AUTOMOBILE VEHICLE DRIVING AND STEERING WHEELS
Filed March 24, 1953 4 Sheets-Sheet 1

INVENTOR
Gaston Robert Bouchard
BY
Bailey, Stephens and Huetty
ATTORNEYS

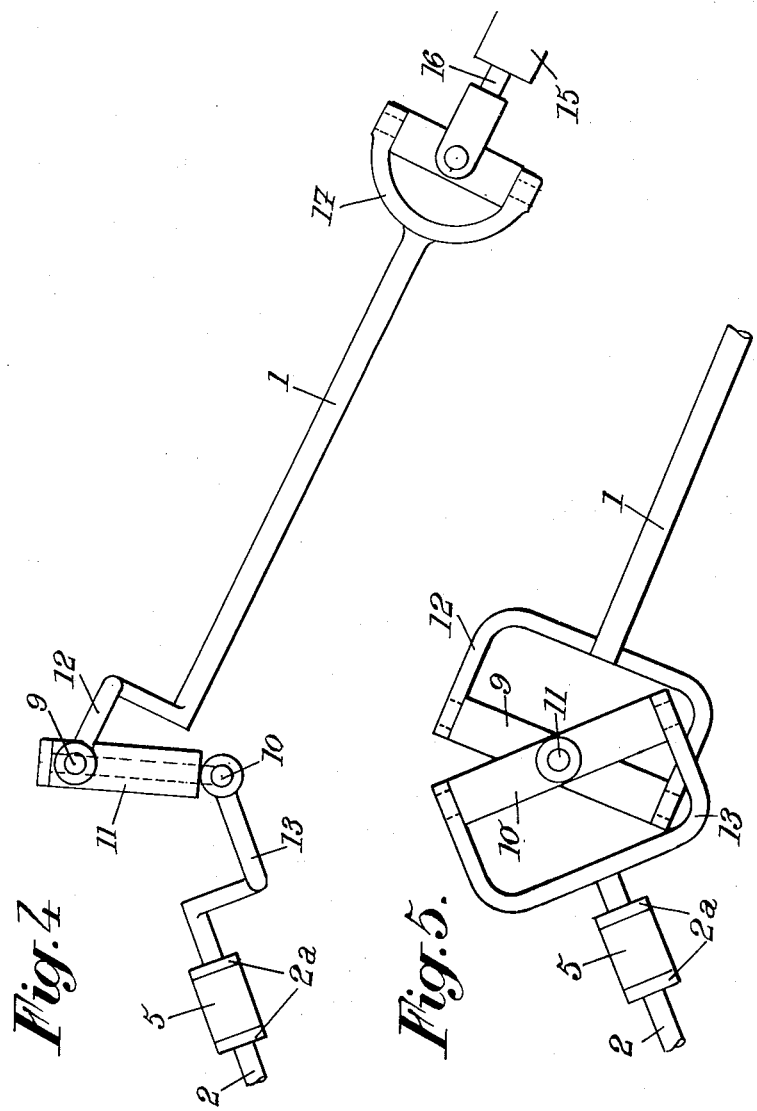

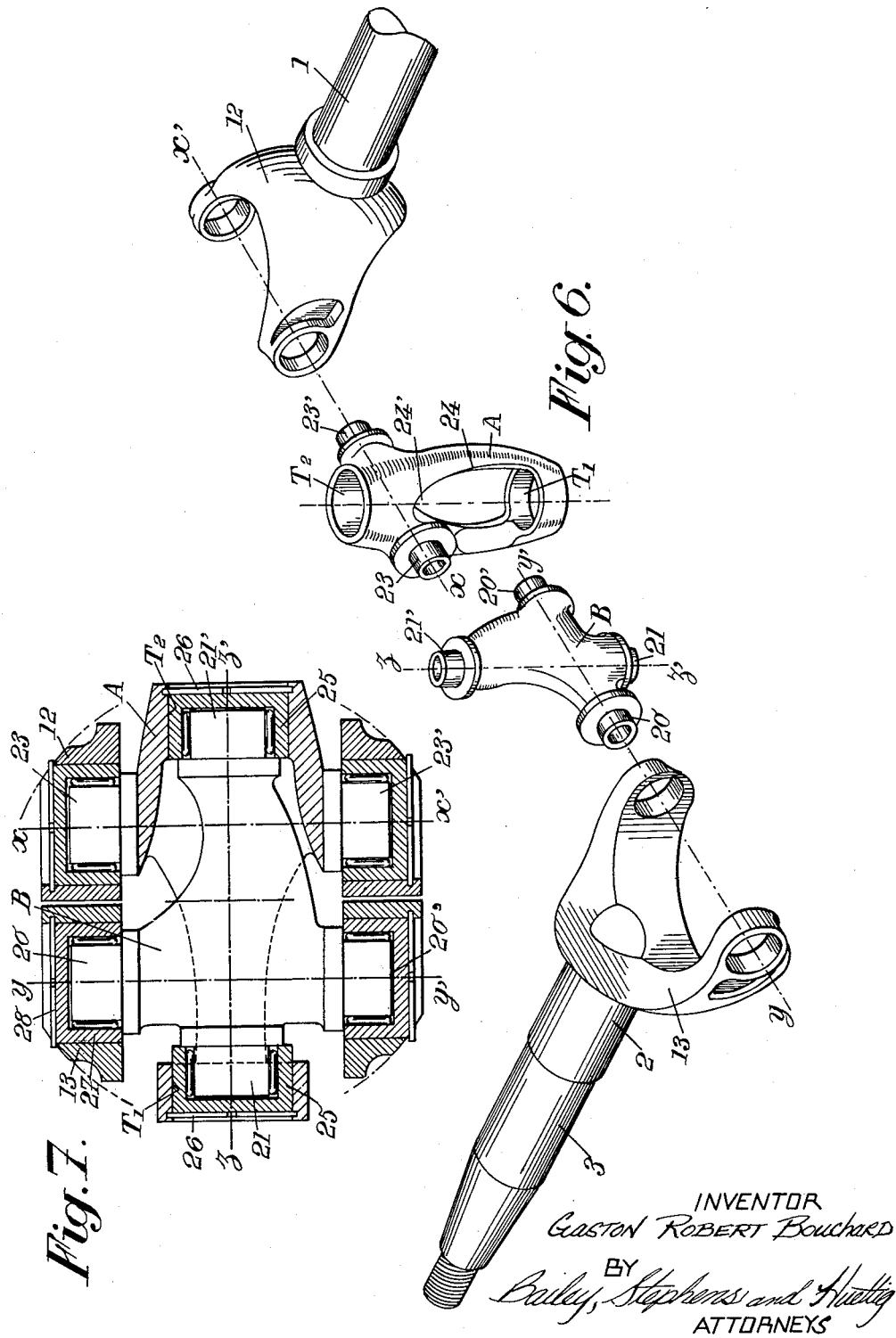

Oct. 25, 1955     G. R. BOUCHARD     2,721,458
UNIVERSAL JOINT TRANSMISSION DEVICES, IN PARTICULAR
FOR AUTOMOBILE VEHICLE DRIVING AND STEERING WHEELS
Filed March 24, 1953     4 Sheets-Sheet 4

INVENTOR
Gaston Robert Bouchard
BY
Bailey, Stephens and Huettig
ATTORNEYS

United States Patent Office 2,721,458
Patented Oct. 25, 1955

2,721,458

UNIVERSAL JOINT TRANSMISSION DEVICES, IN PARTICULAR FOR AUTOMOBILE VEHICLE DRIVING AND STEERING WHEELS

Gaston Robert Bouchard, Bougival, France

Continuation of abandoned application Serial No. 151,281, March 22, 1950. This application March 24, 1953, Serial No. 344,442

Claims priority, application France March 24, 1949

6 Claims. (Cl. 64—21)

The present invention relates to universal joint transmission devices, that is to say devices including a driving shaft and a driven shaft having intersecting respective axes and interconnected through means capable of achieving substantially synchronous transmission of rotation from one shaft to the other for different angles made by one to the other. My invention is more particularly but not exclusively concerned with transmission devices of this kind as used in connection with automobile vehicle driving and steering wheels.

The chief object of my invention is to provide a device of this kind which is better adapted to meet the requirements of practice than those used up to now, in particular from the viewpoint of overall dimensions.

Preferred embodiments of my invention will be hereinafter described with reference to the accompanying drawings, given merely by way of example and in which:

Figs. 4 and 5 are diagrams showing, respectively in top and side view, another embodiment of my invention relative to the same type of wheel as in Fig. 3;

Fig. 6 shows, in perspective view, the elements of an embodiment of a universal joint made according to my invention, the joint being supposed to be taken to pieces and its various elements being shown apart from one another;

Fig. 7 is a sectional view of the same joint the elements of which are now assembled together;

Figure 1:
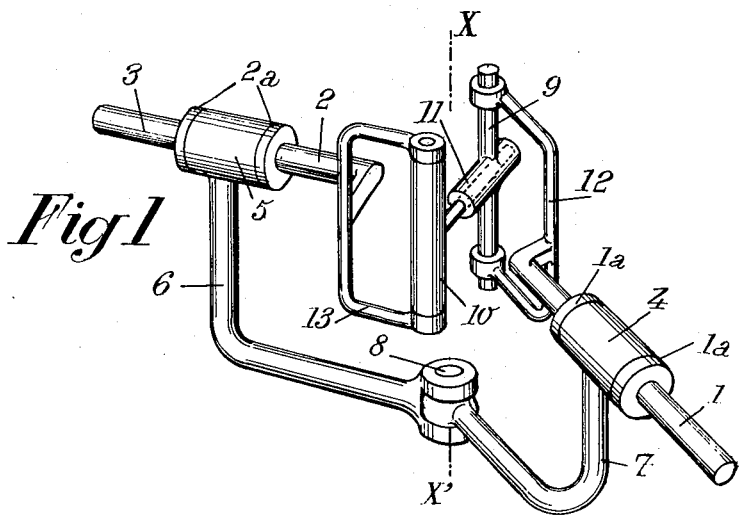
Fig. 1 is a diagrammatic perspective view of a transmission device made according to a first embodiment of my invention for an automobile vehicle driving and steering non-independently suspended wheels.

The device includes a driving shaft 1 adapted to transmit motion to a driven shaft 2 provided at its end with a wheel stub axle 3.

It will first be supposed that these shafts 1 and 2 are carried by bearings 4 and 5 rigid respectively with a stub axle support 6 and an axle 7, these two elements being pivotally interconnected at 8 about an axis XX' which preferably intersects both of the axes of shafts 1 and 2, in order to permit steering displacements of the wheel.

The mechanism which is to transmit rotary movement from shaft 1 to shaft 2 in universal joint fashion includes two intermediate pieces 9 and 10 respectively pivoted to each of these shafts and interconnected by a pivot joint 11 preferably at right angles to the preceding ones.

According to my invention, each intermediate piece 9, 10, is connected to the corresponding shaft 1, 2, through journal and bearing means, surrounding one another, carried by said pieces and shafts, and the respective pivot axes of said means are offset with respect to the corresponding axes of shafts 1, 2, whereby the two intermediate pieces 9, 10 can be disposed side by side, for instance between the branches of the offset forks 12 and 13 provided at the ends of the driving and driven shafts, these shafts being axially fixed in both directions, for instance by means of thrust bearings diagrammatically illustrated in Fig. 1 by annular elements 1a and 2a applied against bearings 4 and 5.

This axial fixation of shafts 1 and 2 is intended to make it possible to position the joint and to achieve the balancing of the axial reactions due to the transverse torques developed in said joint.

I thus obtain a universal joint of diametral dimensions smaller than those of joints of the same kind having their intermediate pieces pivoted to the respective shafts about axes intersecting the shaft axes, which made it necessary to dispose these two intermediate pieces concentrically to each other and to give one of them (the external one) a diametral dimension higher than that necessary for transmitting the driving torque.

Figure 2:
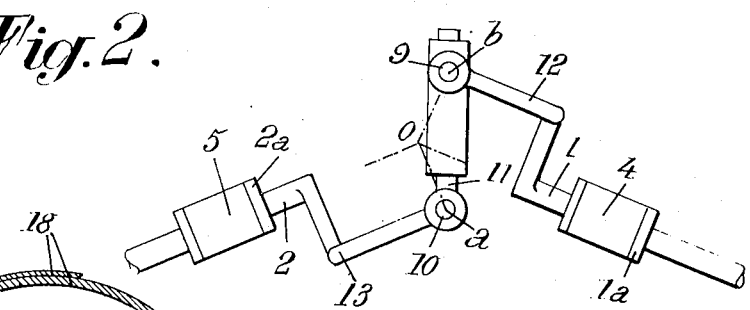
Fig. 2 is a corresponding top view.

I have shown, on Fig. 2, the same joint, seen from above, shafts 1 and 2 occupying, from the point of view of their rotary movement, an angular position for which pivots 9 and 10 are substantially parallel and vertical.

This figure shows that the theoretical triangle oab (o being the point of intersection of the axes of shafts 1 and 2 and a and b the projections of the intermediate piece pivot axes) is an isosceles triangle the equal sides of which are of constant length equal to the offsetting of pieces 9 and 10. As the apex angle of this triangle must be capable of varying, it follows that its base ab must also be of a variable length, which can be obtained, for instance, by constituting joint 11 by two elements engaged in each other in a telescopic fashion, said elements, which are then respectively rigid with each of the intermediate pieces 9 and 10, being both rotatable and axially slidable with respect to each other.

On the other hand, it will be necessary to leave one, and only one, of the end pivots free to slide axially, to avoid strains which would practically oppose rotation of the whole device.

For this purpose, as diagrammatically shown by Fig. 1, I fix piece 10 axially at both ends thereof, against the branches of fork 13, so that it can only have pivoting displacements, and I mount piece 9 both pivotally and slidably between the two branches of fork 12.

If now it is desired to provide a universal joint transmission device for a driving and steering independently suspended wheel, which requires a supplementary degree of freedom between shafts 1 and 2, it will be advantageous to make use of either of the two solutions hereinafter described.

Figure 3:
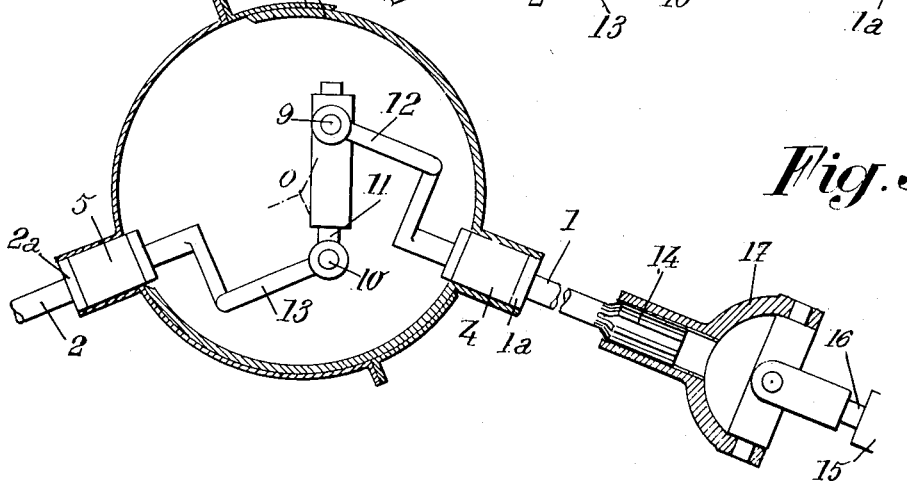
Fig. 3 illustrates an embodiment of the invention relative to the case of a driving and steering independent wheel.

According to a first solution, illustrated by Fig. 3, the universal joint is made exactly as above described.

The driving shaft 1 is slidably, but not rotatably engaged in a sleeve 14 connected to the shaft 16 of differential gear 15 through a Cardan joint 17.

The center of articulation o of the universal joint is materialized by means of a swivel device 18 the two elements of which are respectively rigid with bearings 4 and 5.

According to another embodiment illustrated by Figs. 4 and 5, I dispense with bearing 4, sliding coupling 14 and swivel device 18, but intermediate piece 9 is fixed axially in fork 12 and joint 11 is no longer telescopic but of fixed length.

Thus, the axial thrust which was supported by bearing 4 is transferred, as a consequence of the elimination of sliding coupling 14, to the differential gear 15 through the Cardan joint 17.

On the other hand, despite the absence of a swivel device such as 18, the position of shaft 1 is defined owing to the fact that intermediate member 9 can no longer slide axially with respect to its fork 12 and joint 11 no longer is a telescopic one.

In the embodiments of my universal joint shown by Figs. 6 to 9, shafts 1 and 2 are still provided at their ends with two offset forks 12 and 13 interconnected through two intermediate pieces A and B each pivoted to one fork about a pivot axis ($xx'$ and $yy'$) and capable of rotating relatively to each other about an axis $zz'$ substantially at right angles to $xx'$ and $yy'$.

According to an advantageous feature of my invention, these two pieces are directly assembled with each other through bearings $T_1$ and $T_2$ located on either side of the space which contains pivot axes $xx'$ and $yy'$, whereby the stresses supported by these bearings are substantially reduced.

According to the first of these embodiments, illustrated by Figs. 6 and 7, piece B includes four trunnions, alined two by two, one of these pairs of trunnions (20, 20') being disposed along pivot axis $yy'$ whereas the other pair of trunnions, 21, 21', is disposed at right angles to the preceding one, along axis $zz'$.

In order to facilitate assembly, as it will be hereinafter explained, piece B is given a dissymmetrical shape and is slightly bent in direction $zz'$, thus having a cruciform shape with a curved branch.

Piece A is given the shape of a hollow olive with apertures 24, 24' in its sides and it is provided with openings $T_1$, $T_2$ fitted with bearings 25 arranged to accommodate trunnions 21, 21'. Piece A further carries two trunnions 23, 23' disposed along axis $xx'$.

At least one of the holes provided in the side wall of piece A, for instance 24', is so shaped that it is possible, by a rocking movement, to insert piece B into piece A, so as to bring the axis of trunnions 21 and 21' in coincidence with the axis of openings $T_1$ and $T_2$.

The assembly of the elements of such a joint is then achieved in the following manner.

After having engaged piece B into piece A as above indicated, said pieces are pivoted to each other about $zz'$ by means of bearings 25 engaged in openings $T_1$ and $T_2$ and fixed axially either by means of an elastic ring 26 located on the outer or inner side of the bearing in question, or by means of a ring of a plastic material injected into opposite half grooves provided respectively in the middle portions of bearings 25 and openings $T_1$, $T_2$.

Forks 12 and 13 are then adapted respectively on the pairs of trunnions 23, 23' and 20, 20', the opening of said forks being such that the trunnions can be set in position by engaging one of them as far as possible and then pulling it back to an intermediate position for which the two trunnions of the same pair are engaged in the bores of the fork; it then suffices axially to fix the pairs of trunnions in question, for instance by means of bearings 27 which may be secured in position by elastic rings 28 or any other axial locking means as above indicated.

This embodiment, although giving the desired freedom of rotary movement between pieces A and B, makes it possible to achieve, despite a small volume of the whole, a good rigidity of these pieces and a section adapted to the stresses to be transmitted.

Figure 8:
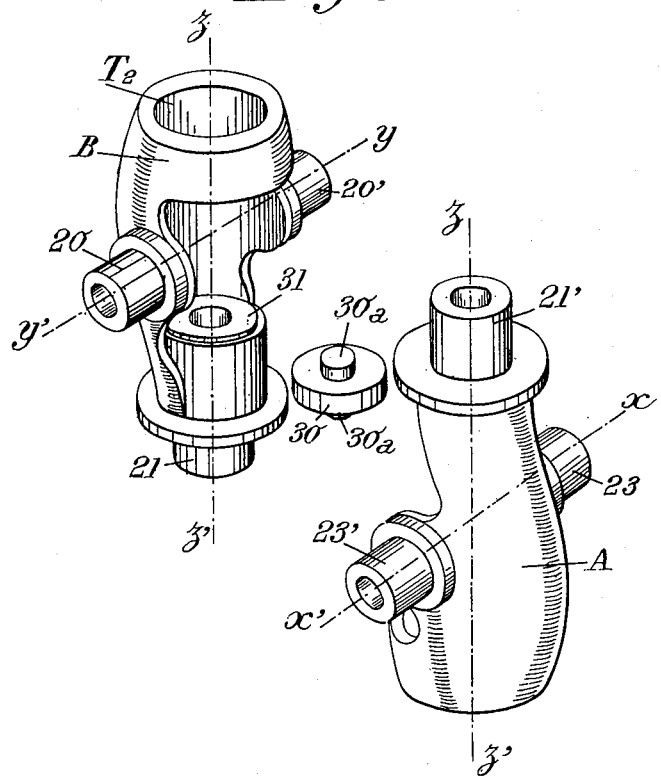
Fig. 8 shows, in perspective view and with the elements set apart, a universal joint made according to another embodiment of my invention.
Figure 9:
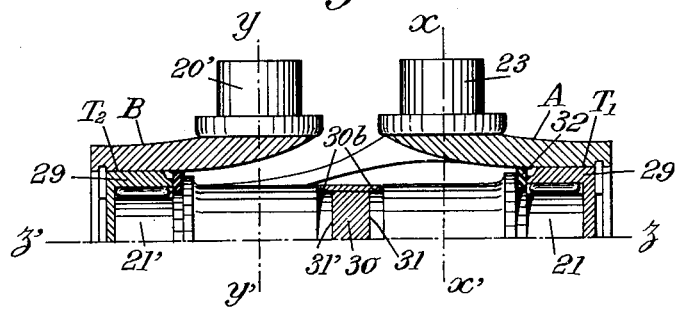
Fig. 9 is a half section of this last mentioned joint with the elements assembled together.

According now to a second embodiment, illustrated by Figs. 8 and 9, I make use of two identical pieces A and B, each of these pieces including a pair of trunnions (23—23' or 20—20') disposed along axes $x$—$x'$ and $y$—$y'$, an opening ($T_1$ or $T_2$) and a trunnion (21 or 21') in line with said bearing along axis $z$—$z'$.

I provide, in the central portion of each of these pieces A and B, a recess of shape and dimensions such that said pieces can be inserted into each other, with a suitable play, to ensure coincidence of the axis line common to opening $T_1$ and trunnion 21' of piece A with the axis line common to opening $T_2$ and trunnion 21 of piece B, the play provided between said pieces making it possible to engage each trunnion 21 or 21' of one of the pieces in the opening $T_1$ or $T_2$ of the other piece.

It then suffices, in order to complete this system, to provide on the one hand, in each opening $T_1$, $T_2$, a bearing 29, and, on the other hand, a spacing part 30 adapted to keep pieces A and B suitably spaced apart from each other in the axial direction, this part 30 advantageously including centering and radial locking means such, for instance, as lugs 30a (Fig. 3) or peripheral collars 30b (Fig. 4).

Figs. 8 and 9 show that the interposed part 30 bears, through its opposed faces, against two plane surfaces 31 and 31' at right angles to axis $zz'$ and respectively rigid with each of the two pieces.

This construction has the following advantages:

Rigidity of the system and reduction of the stresses on the bearings;

Fluidtightness past the bearings owing to the mounting that is adopted, which permits of making use of abutment cups, for instance of the needle bearing type, including a solid bottom which may possibly be completed by a plastic or elastic joint 32 extending advantageously toward the inside of the bearing as shown by Fig. 4;

Possibility, when so desired, to give a certain degree of freedom along the axes by a suitable adjustment of the position of the end abutments.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

This application is a continuation of application Serial No. 151,281, filed March 22, 1950, now abandoned.

What I claim is:

1. A universal joint transmission device which comprises, in combination, two pieces pivoted to each other about a single pivot axis, and two shafts, a driving one and a driven one, each pivoted to one of said pieces respectively about a single pivot axis, these second mentioned pivot axes being located at a distance from each other and each of them substantially intersecting said first mentioned pivot axis and being at least substantially at right angles both to the shaft pivoted thereabout and to said first mentioned pivot axis, each of said shafts being offset with respect to that of the two second mentioned pivot axes about which it is pivoted and toward the other of said second mentioned pivot axes, the amounts of offsetting of said shafts with respect to said second mentioned pivot axes respectively being such that the distance between the respective shaft axes is substantially smaller than the distance between said two second mentioned pivot axes when said shafts extend in opposed parallel directions.

2. A universal joint transmission device which comprises, in combination, two pieces pivoted to each other about a single pivot axis, and two shafts, a driving one and a driven one, each pivoted to one of said pieces respectively about a single pivot axis, these second mentioned pivot axes being located at a distance from each other and each of them substantially intersecting said first mentioned pivot axis and being at least substantially at right angles both to the shaft pivoted thereabout and to said first mentioned pivot axis, each of said shafts being offset with respect to that of the two second mentioned pivot axes about which it is pivoted and toward the other of said second mentioned pivot axes, the amounts of offsetting of said shafts with respect to said second mentioned pivot axes respectively being at least substantially equal to one half of the distance between said two second mentioned pivot axes whereby said shafts are substantially in line with each other, when they extend in opposed parallel directions.

3. A universal joint transmission device which comprises, in combination, two pieces pivoted to each other about a single pivot axis and slidable with respect to each other along said axis, two shafts, a driving one and a driven one, each pivoted to one of said pieces respectively about a single pivot axis, the second mentioned pivot axes being located at a distance from each other and each of them substantially intersecting said first mentioned pivot axis and being at least substantially at right angles both to the shaft pivoted thereabout and to said first mentioned pivot axis, each of said shafts being offset with respect to that of the two second mentioned pivot axes about which it is pivoted and toward the other of said second mentioned pivot axes, the amounts of offsetting of said shafts with respect to said second mentioned pivot axes respectively being at least substantially equal to one half of the distance between said two second mentioned pivot axes whereby said shafts are substantially in line with each other when they extend in opposed parallel directions, one of said shafts being slidable with respect to the piece about which it is pivoted along the pivot axis about which said last mentioned shaft is pivoted to said last mentioned piece, the other shaft and the other piece being fixed with respect to each other in the direction of the pivot axis about which they are pivoted to each other, two thrust bearings for holding said two shafts journalled therein respectively and means for interconnecting said thrust bearings to cause their axes to intersect each other without axial displacements of said thrust bearings with respect to the point of intersection of their respective axes.

4. A universal joint transmission device which comprises, in combination, two pieces pivoted to each other about a single pivot axis and slidable with respect to each other along said axis, two shafts, a driving one and a driven one, each pivoted to one of said pieces respectively about a single pivot axis, the second mentioned pivot axes being located at a distance from each other and each of them substantially intersecting said first mentioned pivot axis and being at least substantially at right angles both to the shaft pivoted thereabout and to said first mentioned pivot axis, each of said shafts being offset with respect to that of the two second mentioned pivot axes about which it is pivoted and toward the other of said second mentioned pivot axes, the amounts of offsetting of said shafts with respect to said second mentioned pivot axes respectively being at least substantially equal to one half of the distance between said two second mentioned pivot axes whereby said shafts are substantially in line with each other when they extend in opposed parallel directions, one of said shafts being slidable with respect to the piece about which it is pivoted along the pivot axis about which said last mentioned shaft is pivoted to said last mentioned piece, the other shaft and the other piece being fixed with respect to each other in the direction of the pivot axis about which they are pivoted to each other, two thrust bearings for holding said two shafts journalled therein respectively and two members pivoted to each other and each carrying one of said bearings with the axis thereof intersecting the axis about which said members are pivoted to each other at the same point of said axis for both of said bearings.

5. A universal joint transmission device which comprises, in combination, a hollow piece including a pair of bearings located on opposed sides of said piece and having both the same axis and a pair of trunnions located on opposed sides of said piece and having both the same axis, which intersects the first mentioned one at right angles thereto, a second piece including a first pair of trunnions located on opposed sides of said second piece, having both the same axis and journalled in said bearings of the first piece respectively and a second pair of trunnions located on opposed sides of said second piece and having both the same axis, which intersects the last mentioned one at right angles thereto, two shafts, a driving one and a driven one, a fork carried by one of said shafts including a pair of coaxial bearings respectively formed in the branches of said fork and fitting pivotally on the second pair of trunnions of the second piece respectively, and a fork carried by the other shaft including a pair of coaxial bearings respectively formed in the branches of said last mentioned fork and fitting pivotally on the pair of trunnions of the first mentioned piece respectively, each of said shafts being offset with respect to its fork toward the trunnions about which the fork of the other shaft is pivoted, whereby said shafts are substantially in line with each other when they extend in opposed parallel directions.

6. A universal joint transmission device which comprises, in combination, a hollow piece including a trunnion and a bearing respectively located on opposite sides of said piece and having both the same axis and a pair of trunnions located on opposite sides of said piece and having both the same axis, which intersects the first mentioned axis at right angles thereto, a second hollow piece including a bearing and a trunnion located on opposite sides of said second piece and having both the same axis, said last mentioned trunnion being journalled in the bearing of the first mentioned piece and the first mentioned trunnion of said first mentioned piece being journalled in said bearing of the second piece, said second piece further including a pair of trunnions located on opposite sides thereof and having both the same axis, which intersects the common axis of the coaxial bearing and trunnion of the second piece, two shafts, a driving one and a driven one, and a fork carried by each of said shafts including a pair of coaxial bearings respectively formed in the branches of said fork and fitting pivotally on the pair of trunnions of one of said pieces respectively, each of said shafts being offset with respect to its fork toward the trunnions about which the fork of the other shaft is pivoted, whereby said shafts are substantially in line with each other when they extend in opposed parallel directions.

References Cited in the file of this patent

UNITED STATES PATENTS 2,547,435   Bouchard _____ Apr. 3, 1951